(12) United States Patent
Marston et al.

(10) Patent No.: US 6,375,833 B1
(45) Date of Patent: Apr. 23, 2002

(54) FILTER ASSEMBLY WITH UV TREATMENT, FILTER BYPASS, AND CLOGGING INDICATOR

(75) Inventors: Kevin Ian Michael Marston; Andrew David Boddy, both of Aylesbury (GB)

(73) Assignee: Hozelock Limited, Aylesbury (GB)

( * ) Notice: Subject to any disclaimer, the term of this patent is extended or adjusted under 35 U.S.C. 154(b) by 0 days.

(21) Appl. No.: 09/587,889

(22) Filed: Jun. 6, 2000

(30) Foreign Application Priority Data

Jul. 13, 1999 (GB) .............................................. 9916292

(51) Int. Cl.[7] .............................................. B01D 27/10
(52) U.S. Cl. ........................... 210/85; 210/94; 210/132; 210/295; 210/192; 116/268; 422/186.3
(58) Field of Search .............................. 210/85, 90, 94, 210/95, 130, 132, 133, 150, 151, 192, 295, 433.1, 510.1, 440; 116/268; 119/259; 422/24, 186.3

(56) References Cited

U.S. PATENT DOCUMENTS

| | | | | |
|---|---|---|---|---|
| 2,935,040 | A | * | 5/1960 | Steensen |
| 3,508,657 | A | * | 4/1970 | Cooper |
| 3,551,091 | A | * | 12/1970 | Veloz |
| 3,622,001 | A | * | 11/1971 | Oden |
| 4,561,974 | A | * | 12/1985 | Bernard et al. |
| 4,997,563 | A | * | 3/1991 | Jones |
| 5,382,355 | A | * | 1/1995 | Arlozynski |

FOREIGN PATENT DOCUMENTS

EP 0899237 A2 * 3/1999

* cited by examiner

*Primary Examiner*—Joseph W. Drodge
*Assistant Examiner*—Terry K. Cecil
(74) *Attorney, Agent, or Firm*—Lee, Mann, Smith, McWilliams, Sweeney & Ohlson

(57) ABSTRACT

A filter assembly for filtering pond or aquarium water includes a container (1,2) with an inlet chamber (15) having an upstream region (36) and a downstream outlet (13) leading to an outlet chamber (22). A filter (16) is positioned in the inlet chamber (15) between the upstream region (36) and the outlet (13). In use, progressive clogging of the filter causes the water pressure in the upstream region (36) to rise until it reaches a predetermined threshold when a normally-closed relief valve (28,29) opens to allow water to pass from the upstream region (36) to the outlet chamber (22) without passing through the filter (16). The valve has a coloured valve stem (28) providing a visual indication that the valve is open and that the filter is blocked and requires cleaning. In one embodiment, the outlet chamber (22) contains a source (19) of ultra-violet radiation to which the flow of water is exposed, regardless of whether the valve (28,29) is in the open or closed condition.

11 Claims, 11 Drawing Sheets

FILTER ASSEMBLY WITH UV TREATMENT, FILTER BYPASS, AND CLOGGING INDICATOR

BACKGROUND OF THE INVENTION

This invention relates to filter assemblies for filtering water, for example pond or aquaria water.

SUMMARY OF THE INVENTION

According to the invention there is provided a filter assembly for filtering a flow of water, the assembly comprising a container enclosing an inlet chamber with an upstream region and a downstream outlet, a filter medium in the inlet chamber between the upstream region and the downstream, outlet, an outlet chamber downstream of the outlet and a valve which normally occupies a closed condition but which, upon internal water pressure in the upstream region exceeding a predetermined threshold, occupies an open condition enabling water to pass from the upstream region to the outlet chamber without passing through the filter medium, the open condition of the valve being visually apparent and thus providing to the user a visual indication of the open condition of the valve, in use the upstream region being capable of resisting rising internal water pressure caused by progressive clogging of the filter medium, until the internal water pressure in the upstream region exceeds the predetermined threshold whereupon the valve opens and the visual indication appears.

The outlet chamber may contain a source of ultra-violet radiation to which the flow of water is exposed, regardless of whether the valve is in the open condition or the closed condition.

Two embodiments of filter assembly according to the invention will now be described, by way of example, with reference to the accompanying drawings, in which:

BRIEF DESCRIPTION OF THE INVENTION

Figure 2:
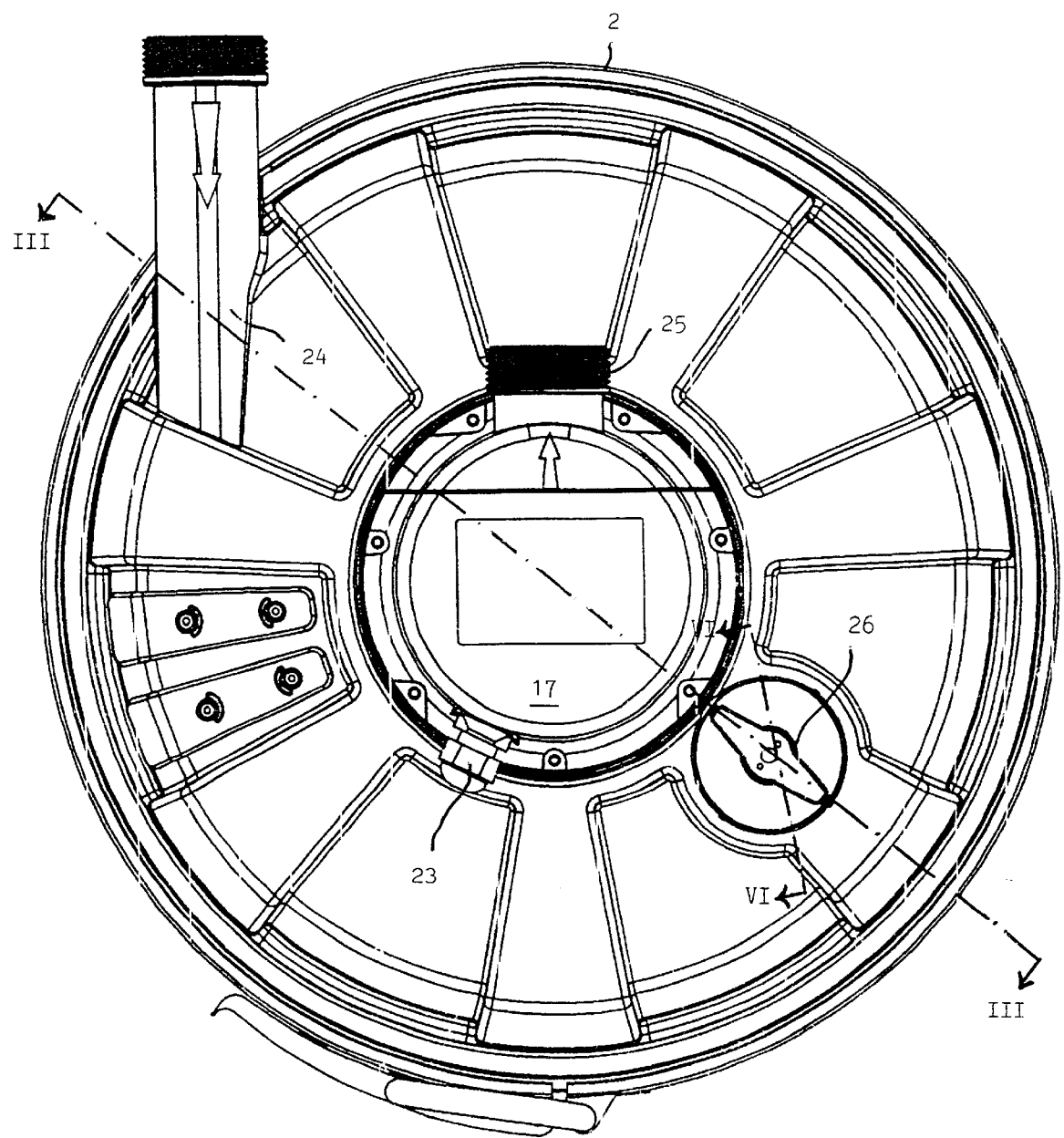
FIG. 2 is a plan view of the first embodiment of filter assembly.
Figure 4:
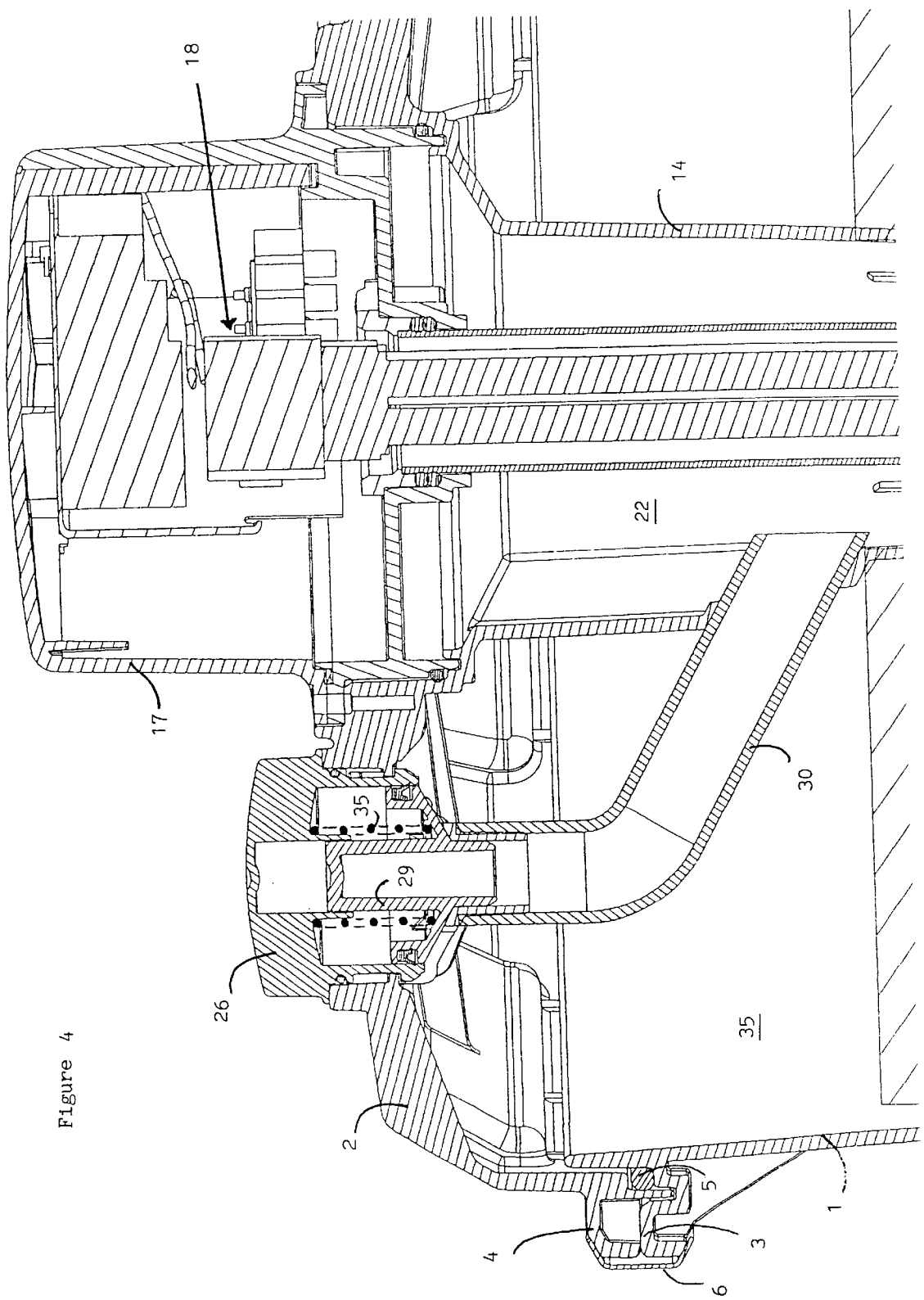
FIG. 4 is a sectional view, on an enlarged scale, of part of FIG. 3.
Figure 5:
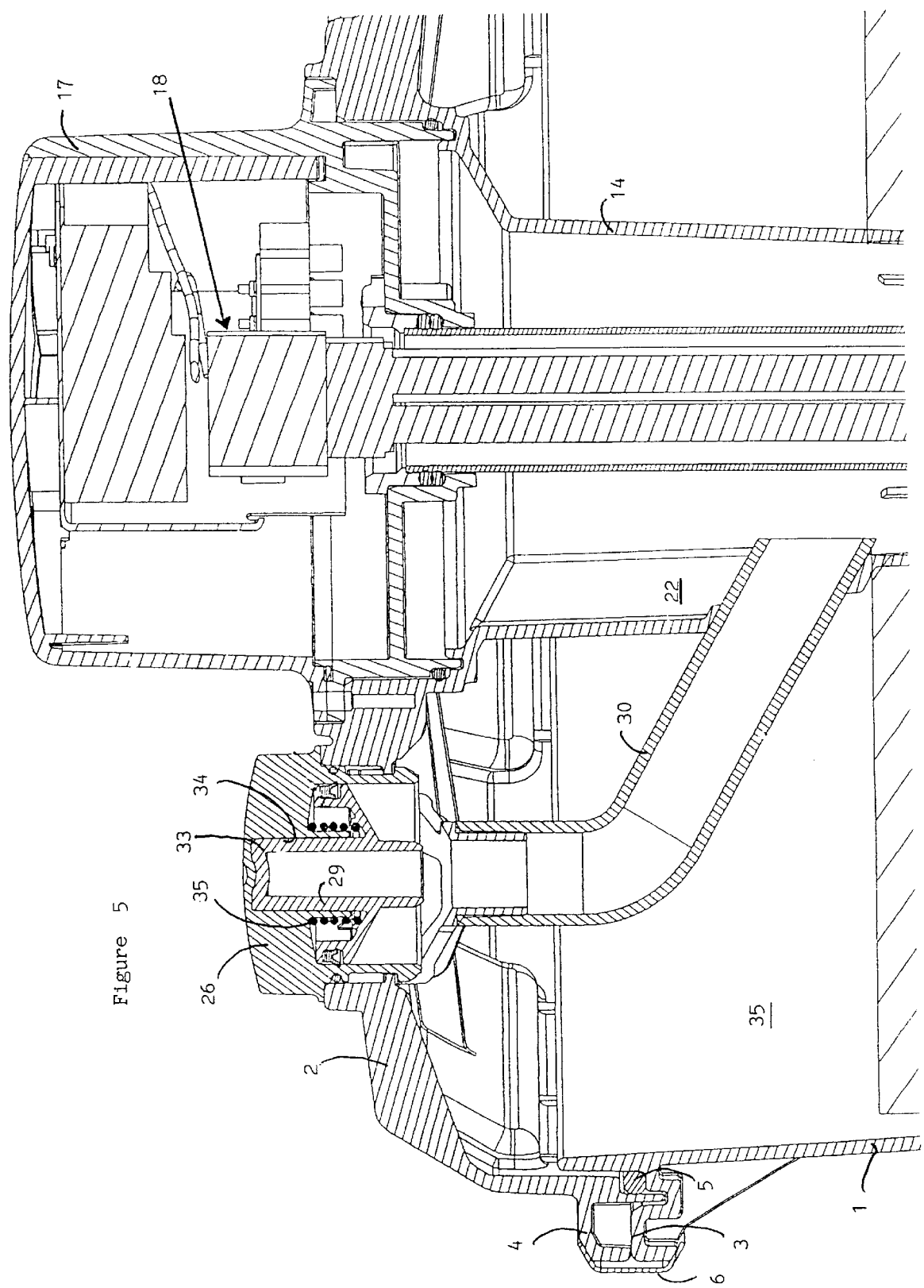
Figure 6:
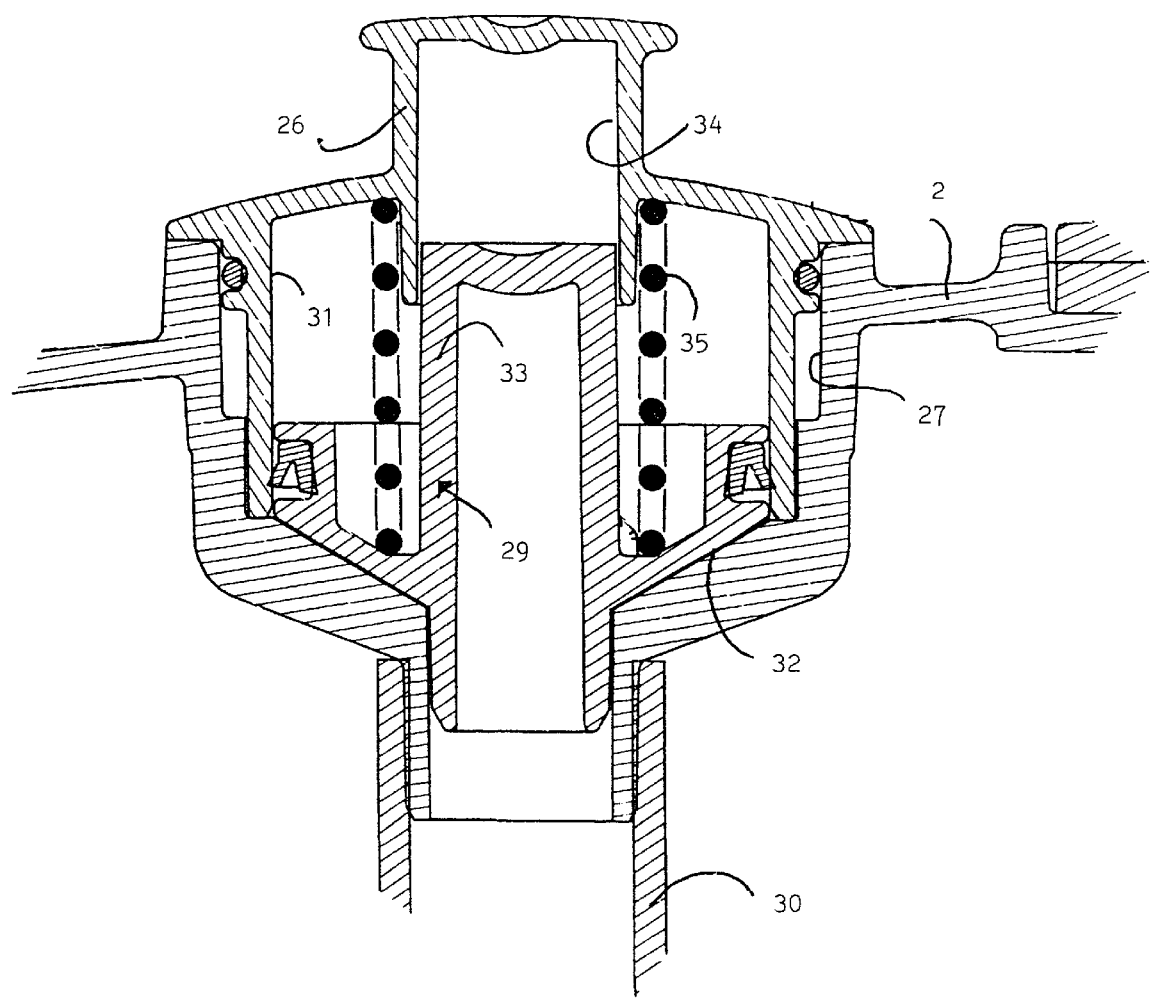
Figure 7:
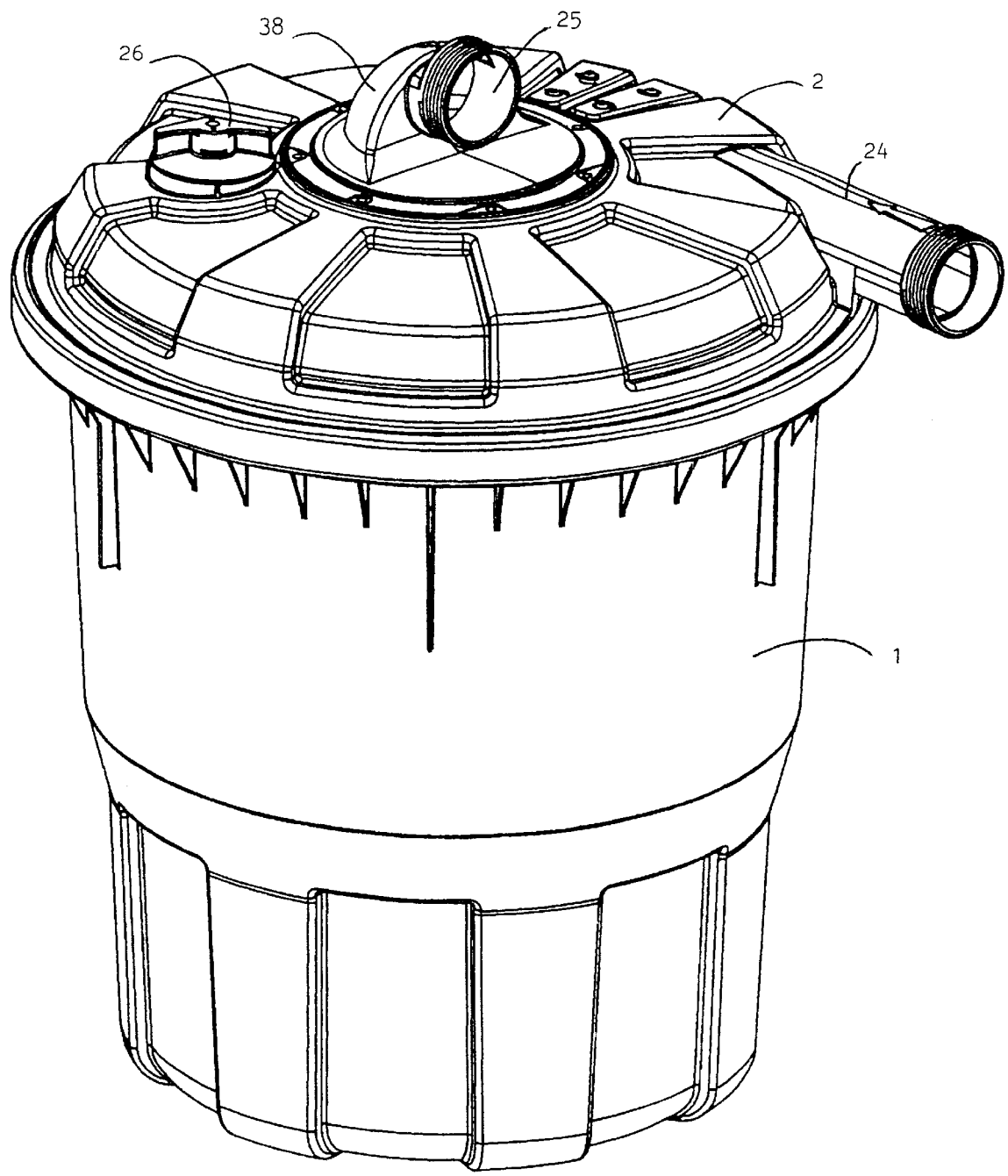
Figure 8:
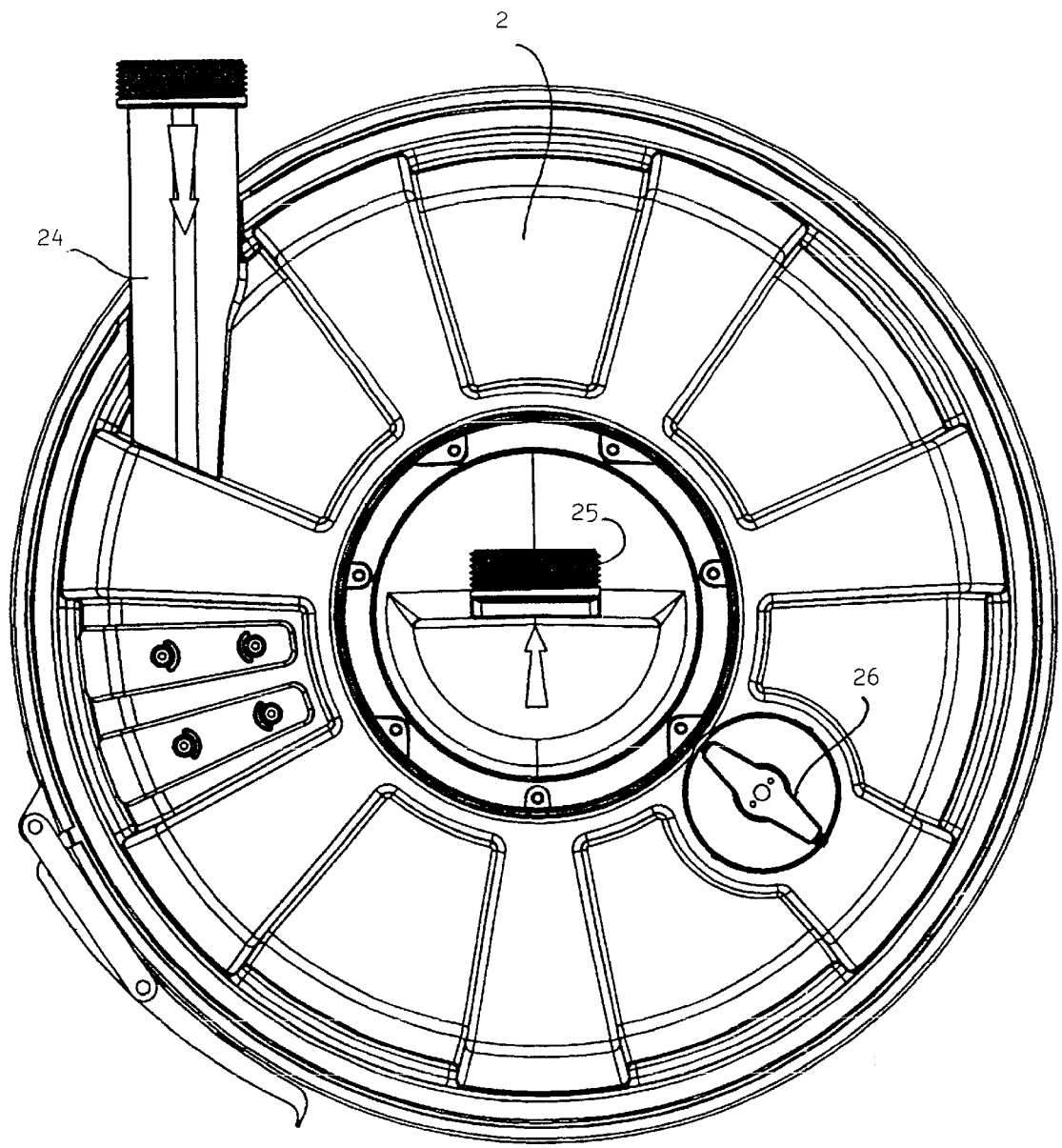
Figure 9:
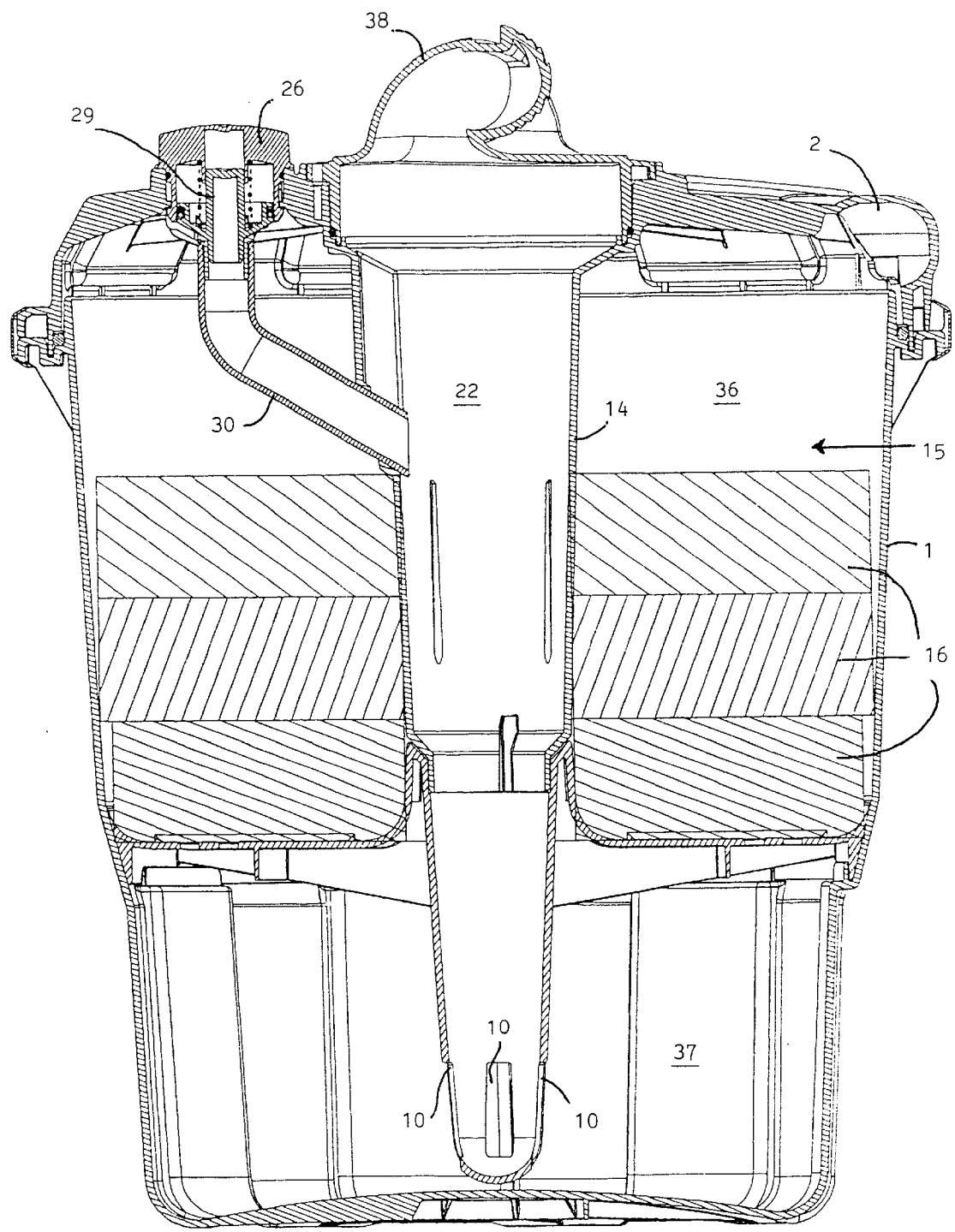
Figure 10:
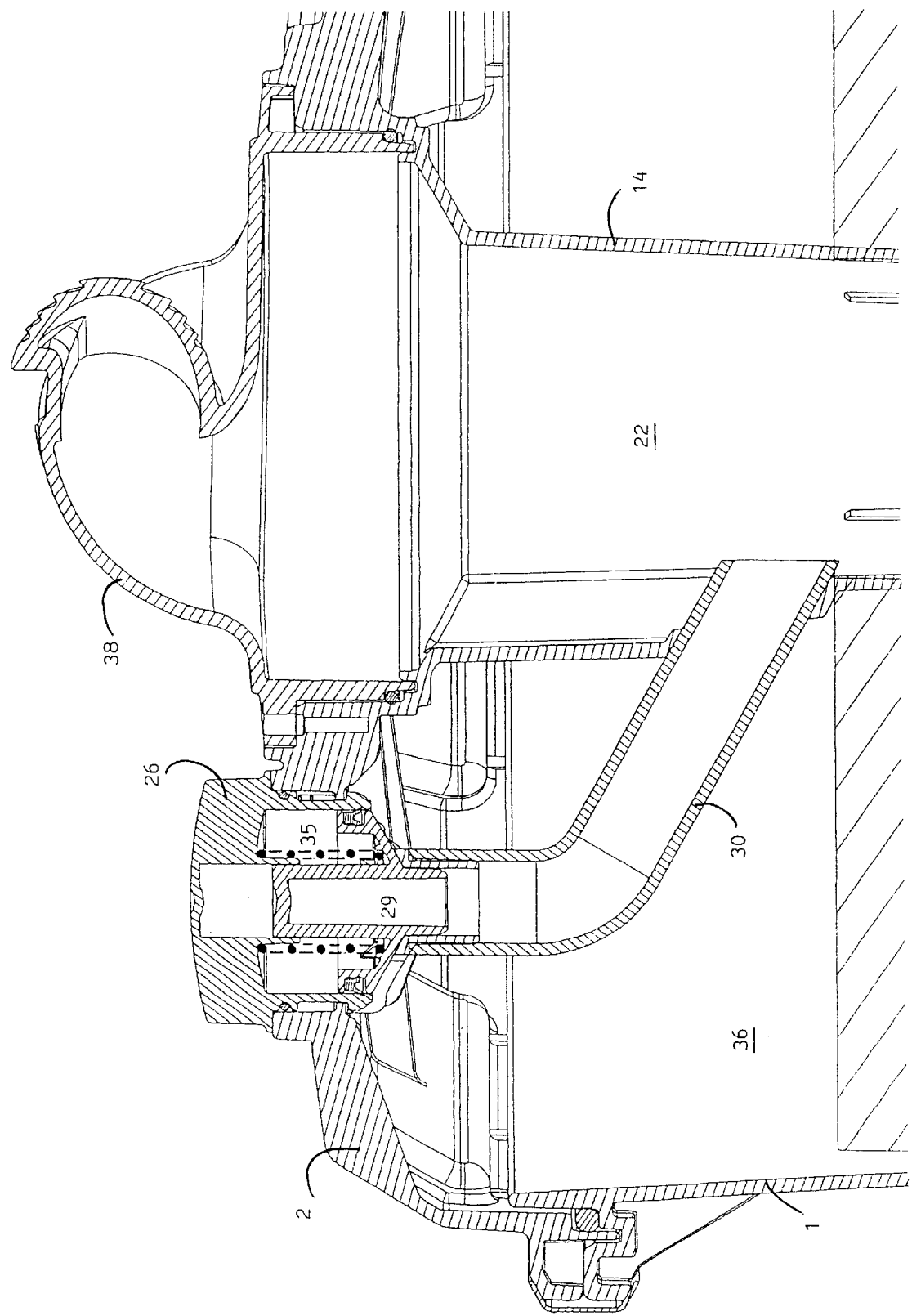
Figure 11:
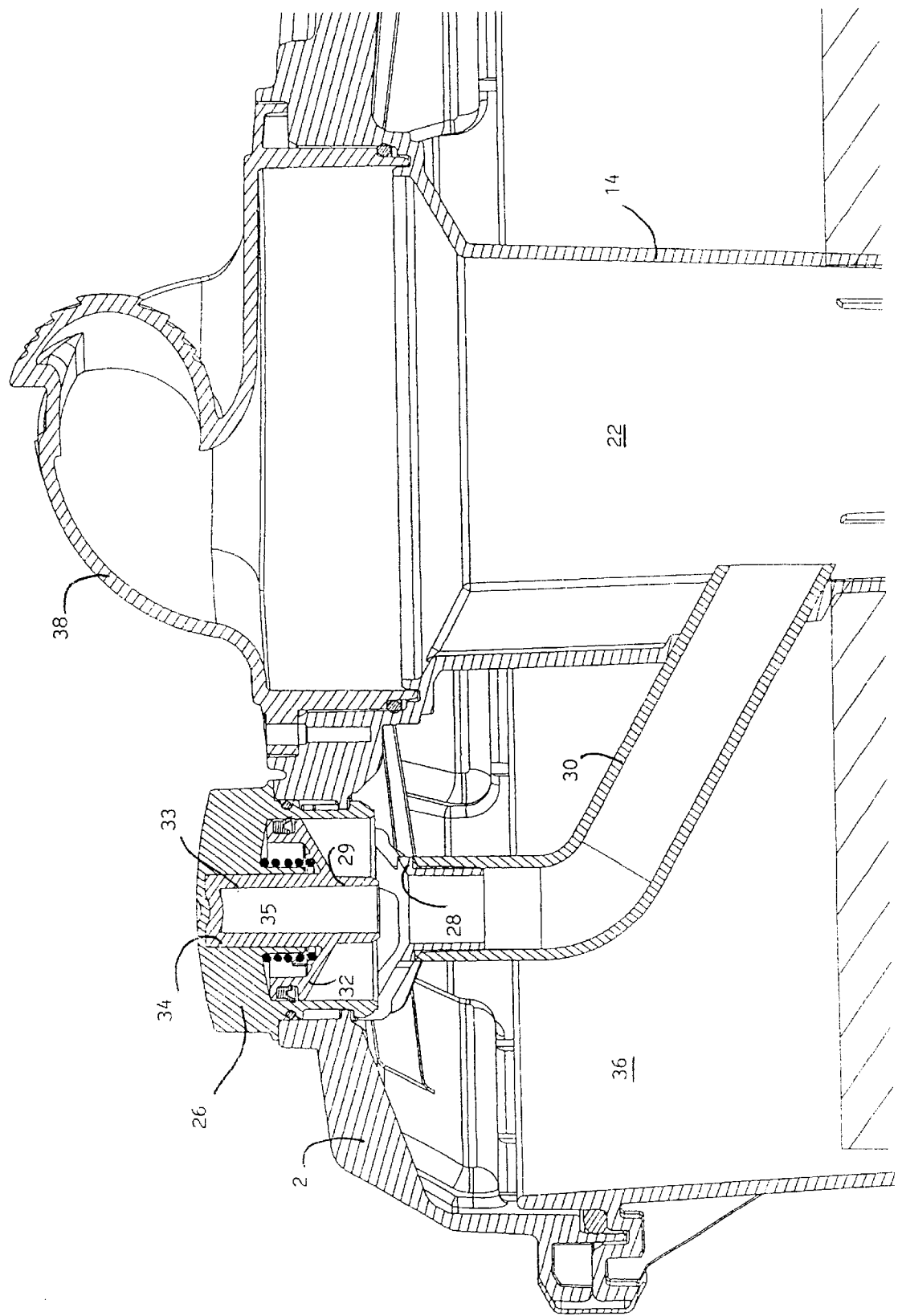

FIG. 5 is a view corresponding to that of FIG. 4 but with a movable valve member in an alternative open position, FIG. 6 is a sectional view, on an enlarged scale, on the line VI—VI in FIG. 2, FIG. 7 is an isometric view of the second embodiment of filter assembly, FIG. 8 is a plan view of the second embodiment of filter assembly, FIG. 9 is a sectional view through the filter assembly of FIG. 8, FIG. 10 is a sectional view, on an enlarged scale, of part of FIG. 9, and FIG. 11 is a view corresponding to that of FIG. 10 but with a movable valve member in an alternative open position.

DETAILED DESCRIPTION OF THE DRAWINGS

Figure 1:
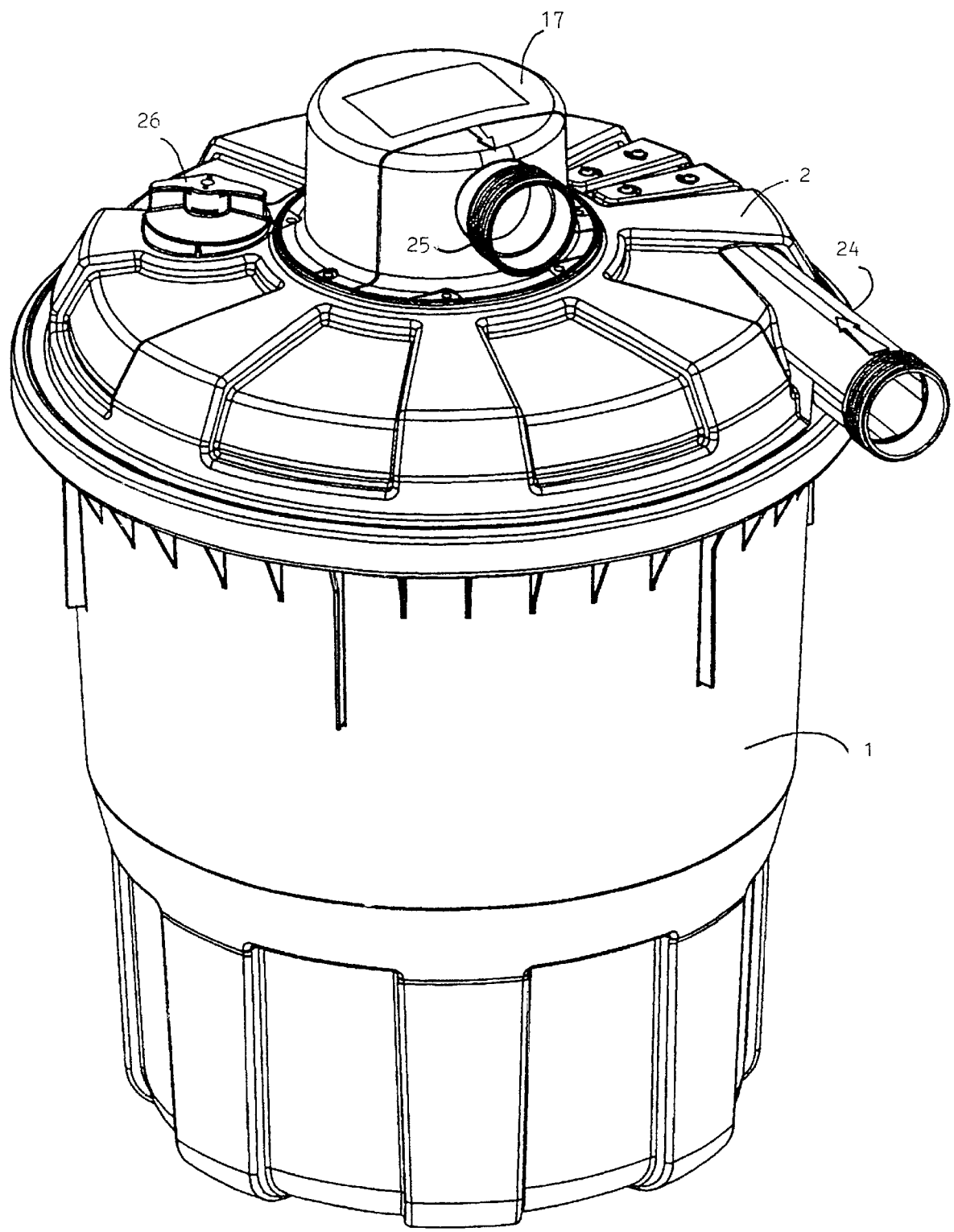
FIG. 1 is an isometric view of the first embodiment of filter assembly.
Figure 3:
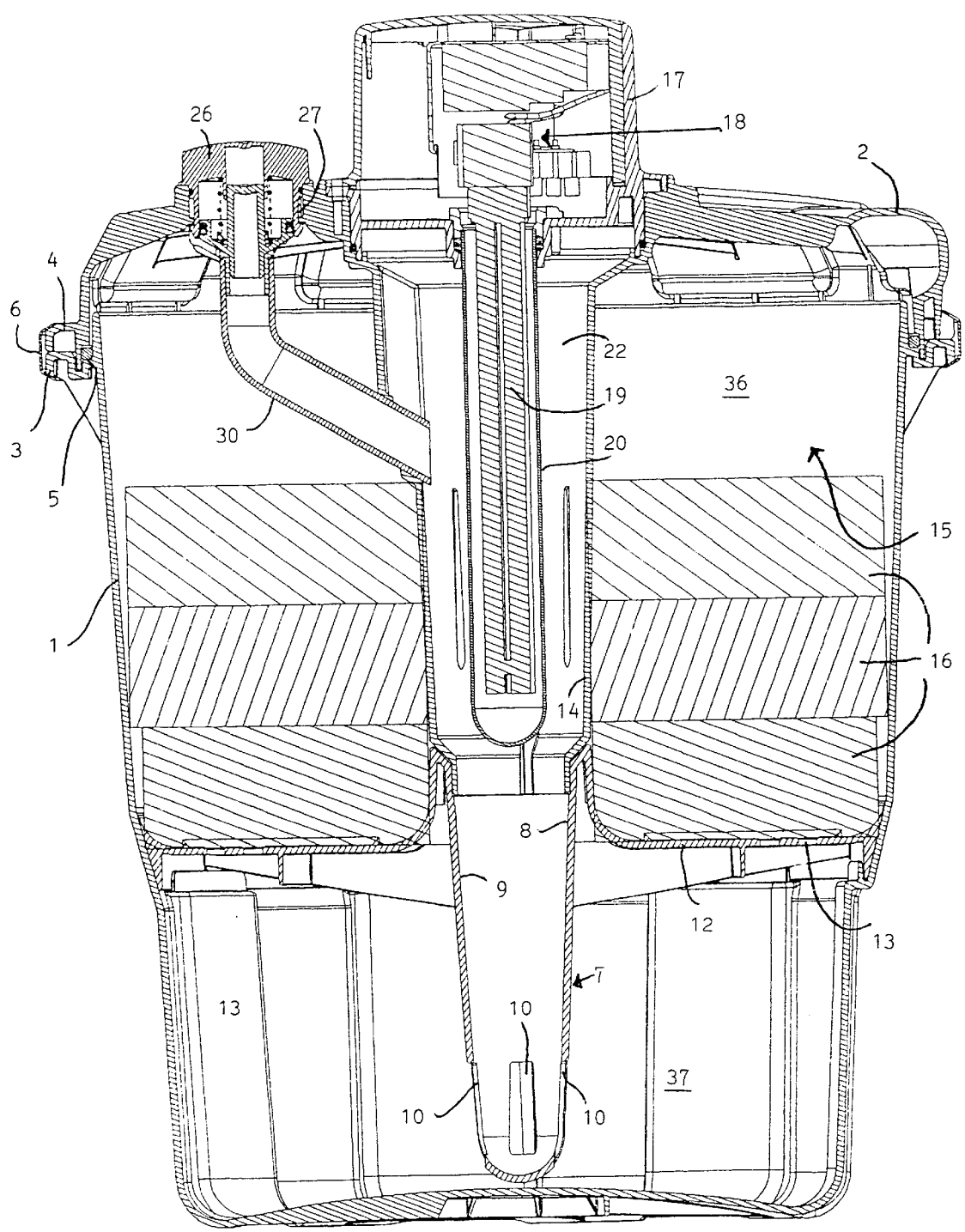
FIG. 3 is a sectional view on the line III—III in FIG. 2.

Referring principally to FIGS. 1, 2 and 3, the first embodiment of filter assembly comprises a container formed by a plastics body 1 the upper end of which is closed by a plastics lid 2. The body 1 and lid 2 have respective external flanges 3, 4 (FIG. 3) which make sealing engagement with the aid of an intervening O-ring 5. The flanges 3 and 4 are detachably clamped together by a circumferential band clamp 6 securable by a toggle clip. This enables the lid 2 to be removed from the body 1 or to be replaced and sealed thereon. As best seen in FIG. 3, the container accommodates an internal moulding 7 having a central hub like region 8 from which depends a tapering hollow stem 9 having a series of slots 10 adjacent its lower end. A radial wall 12 surrounds the hub region 8 and the radial wall 12 has a series of outlet apertures 13. Located in the hub region is the lower end of a downwardly extending tube 14 integrally moulded with the lid 2. The annular volume which is within the body 1, which surrounds the tube 14 and which is located above the radial wall 12 defines an inlet chamber 15 accommodating three layers (or any convenient number of layers) of filter medium 16 each in the form of an annular body of open-celled plastics foam material.

The lid 2 supports an upwardly projecting housing 17 enclosing an ultra violet assembly 18 which includes an ultra violet lamp 19 extending, together with its tubular shield 20, into an outlet chamber 22 defined within the tube 14 and the stem 9. Electrical power (at mains voltage) for the ultra violet assembly is supplied to the filter assembly by means of an electrical cable (not shown) passing through an inlet gland 23 on the housing 17.

The lid 2 has an integrally moulded inlet duct 24 forming a water inlet and the housing 17 has an integrally moulded outlet duct 25 forming a water outlet.

On the side of the lid 2 opposite the inlet duct 24 is a cap 26 moulded from a transparent plastics material. The cap 26 is located in a circular opening 27 in the lid 2, and the cap covers a valve comprising a stationary valve seating 28 and a movable valve member 29. The valve seating 28 is defined by the upper end of a bypass duct 30 which, from its upper end, extends first vertically downwardly and then inclines downwardly to a lower end terminating in the outlet chamber 22. The valve member 29 has a frusto-conical lower surface 32 exposed to water pressure within the upstream region 36 of the inlet chamber 15. The valve member 29 slides, with sealing engagement, in a wide bore 31 in the cap 26, and the valve member 29 also has a central piston-like stem 33 guided for vertical sliding movement within a narrow bore 34 in the cap 26. A small opening in the centre of the cap 26 provides communication between the bore 34 and the surroundings, to prevent movement of the stem 33 being impeded by high or low pressure in the bore 34. A helical compression spring 35 acting between the underside of the cap 26 and a recess in the valve member 29 biases the latter towards its closed position in which the underside of the valve member 29 engages the valve seating 28 to close the valve. If the pressure of water within the upstream region 36 of the inlet chamber 15 exceeds a certain threshold, the valve member 29 moves, against its spring loading, to open the valve, enabling water to flow from the upstream region 36 of the inlet chamber, through the bypass duct 30 and then into the outlet chamber 22.

In use, the volume of the container below the wall 12 and surrounding the stem 9 defines a compartment 37 which is filled, or substantially filled, by plastics granules (not shown) having a high surface-to-volume ratio. The lid 2 is applied to the body 1 and sealed thereon. A supply of the water to be filtered is pumped (e.g. from a garden pond) into the inlet duct 24 and an outlet pipe for the delivery of filtered water is attached to the outlet duct 25. The inlet duct 24 causes the incoming flow of water to enter the upstream region 36 of the inlet chamber 15 in a tangential direction and the resulting swirling or vortex movement causes any large particles in the water flout to be deposited in the inlet chamber. The water then passes downwardly through the filter medium 16, being mechanically filtered thereby, and then passes through the apertures 13 so as to enter the compartment 37 where bacteria tend to accumulate on the plastics granules so as to provide biological treatment. After this, the water passes through the slots 10, enters the stem 9 and then passes upwardly through the outlet chamber 22 where it is subjected to ultra violet radiation, before leaving the filter assembly by the outlet duct 25.

After a period of time, the filter medium 16 tends to become progressively more clogged and this causes the water pressure in the upstream region 36 of the inlet chamber to rise. When the pressure exceeds the predetermined threshold, the force on the underside of the valve member 29 is sufficient to overcome the bias provided by the helical tension spring 35 and the valve member 29 moves to its open position, allowing water to pass from the upstream region 36, through the bypass duct 30 and thence into the outlet chamber 22 where it is subjected to ultra-violet radiation before leaving the filter assembly. Hence, the water flow is subjected to ultra-violet radiation regardless of whether the valve is in the open condition or the closed condition.

When the valve member 29 moves to its open position, its stem 33 moves upwardly within the bore 34. The valve member 29 is moulded from a red plastics material and the cap 26 is moulded from a transparent plastics material so the assumption by the valve member 29 of its raised position causes the upper end of the stem 33 to be visible through the cap 26 and provide a visual indication or warning that the filter medium is blocked and requires cleaning. To unblock the filter, the lid 2 is removed from the body 1 and the foam filter medium 16 is removed, being washed and squeezed to remove detritus, the cleaned filter medium then being replaced in the body 1. The lid 2 is then resealed on the body 1 and the assembly is ready for re-use. It will be appreciated that the valve member 29 reverts to its closed position when the pressure in the upstream region 36 of the inlet chamber drops below the predetermined threshold.

To clean the valve and adjacent areas, the cap 26 is rotated through about 90°, partially withdrawn and then rotated back through 90°, the cap 26 then being free of inwardly projecting ribs on the lid and being capable of complete withdrawal therefrom. For ease of turning, the cap 26 has two wing-like ribs projecting outwardly from a central hub.

The second embodiment of filter assembly is similar to the first embodiment except that it is devoid of an ultraviolet assembly. In FIGS. 7 to 11 parts corresponding to those of FIGS. 1 to 7 have been given the same reference numerals. In the second embodiment, the housing 17 is replaced by a central moulding 38 providing the outlet duct 25. The valve in the second embodiment is constructed in an identical way to that of the first embodiment and operates in an identical fashion. That is, when water pressure in the upstream region 36 of the inlet chamber 15 exceeds a predetermined threshold determined by the stiffness of the spring 35, the valve member 29 moves to its open position, allowing water to pass through the bypass duct 30 and enter the outlet chamber 22, the coloured valve stem 33 providing the visual indication that the filter medium 16 is blocked and requires cleaning.

What is claimed is:

1. A filter assembly for filtering a flow of water, the assembly comprising a container enclosing an inlet chamber with an upstream region and a downstream outlet, a filter medium in the inlet chamber between the upstream region and the downstream outlet, an outlet chamber downstream of the outlet and a valve which normally occupies a closed condition but which, upon internal water pressure in the upstream region exceeding a predetermined threshold, occupies an open condition enabling water to pass from the upstream region to the outlet chamber without passing through the filter medium, the open condition of the valve being visually apparent and thus providing to the user a visual indication of the open condition of the valve, in use the upstream region being capable of resisting rising internal water pressure caused by progressive clogging of the filter medium, until the internal water pressure in the upstream region exceeds the predetermined threshold whereupon the valve opens and the visual indication appears, and in which the outlet chamber contains a source of ultra-violet radiation to which the flow of water is exposed, regardless of whether the valve is in the open condition or the closed condition.

2. A filter assembly according to claim 1, wherein the container comprises a body and a lid sealable with respect to the body but removable from the body for access to the filter medium for cleaning of the latter.

3. A filter assembly according to claim 2, wherein a cap is removably mounted in the lid of the container.

4. A filter assembly according to claim 1, wherein the valve comprises a movable valve member which serves as the visual indication.

5. A filter assembly according to claim 4, wherein one end of the valve member is biased towards a valve seating and the other end of the valve member serves as said visual indication.

6. A filter assembly according to claim 5, wherein the valve member is moulded from a coloured plastics material and said other end is guided for movement in a transparent cap through which said other end of the valve member is visible when the valve is in the open condition.

7. A filter assembly according to claim 5, wherein the valve seating is disposed at an inlet end of a bypass duct leading to the outlet chamber, water passing from the upstream region, through the bypass duct and into the outlet chamber when the valve is in the open condition.

8. A filter assembly according to claim 1, wherein the inlet chamber is annular and surrounds the outlet chamber.

9. A filter assembly according to claim 1, wherein the downstream outlet leads to a compartment accommodating plastics granules for attracting bacteria providing biological treatment to the water.

10. A filter assembly according to claim 9, wherein the compartment is located in the base of the container beneath the inlet chamber, the outlet chamber being defined by the space within a tube which extends downwardly through the inlet chamber and into the compartment, the tube wall being apertured at its lower end for the passage of water from the compartment to the outlet chamber.

11. A filter assembly according to claim 1, wherein the filter medium comprises open-celled foam material.

* * * * *